Sept. 10, 1968   B. W. BARRINGER   3,400,463
MEASURING AND RECORDING ARRANGEMENTS
Original Filed Aug. 12, 1963   2 Sheets-Sheet 1
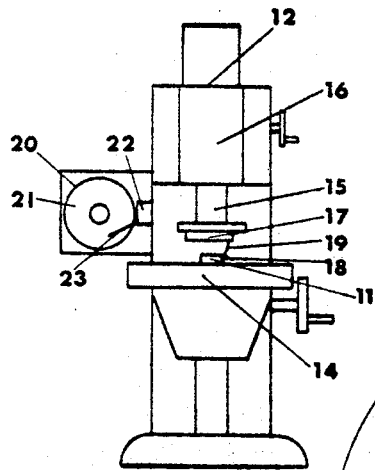
FIG. 1
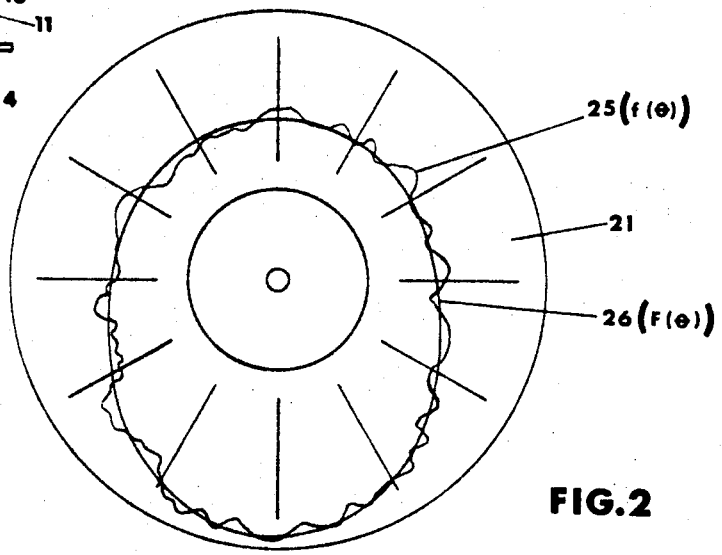
FIG.2
FIG. 3
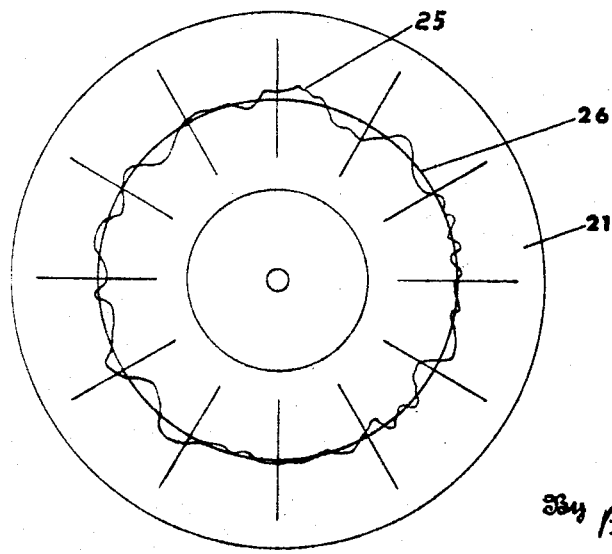
Inventor
Brian Wilfred Barringer
By Pierce, Scheffler & Parker
Attorneys United States Patent Office 3,400,463
Patented Sept. 10, 1968

3,400,463
MEASURING AND RECORDING
ARRANGEMENTS
Brian Wilfred Barringer, East Twickenham, England, assignor, by mesne assignments, to The Rank Organisation Ltd., London, England, a British company
Continuation of application Ser. No. 301,396, Aug. 12, 1963. This application Dec. 21, 1966, Ser. No. 603,688
Claims priority, application Great Britain, Aug. 28, 1962, 32,987/62
11 Claims. (Cl. 33—174)

ABSTRACT OF THE DISCLOSURE

Apparatus for inspecting the profile of a noncircular workpiece for variations from a reference profile. An electrical sensor engages the surface of the workpiece as these two elements are relatively rotated. The output of the sensor is fed during a first revolution to a display device and to sine and cosine potentiometers which rotate at a multiple of the rate of relative rotation between the sensor and workpiece. The sensor output and the potentiometer outputs are integrated and stored. The stored signals are summed and fed to the display device to superimpose upon the profile indication a reference indication during a subsequent revolution.

---

This application is a continuation of my copending application Ser. No. 301,396, filed Aug. 12, 1963.

This invention is concerned with improvements in or relating to the inspection of surface profiles, and is concerned especially, but not exclusively, with apparatus for and a method of indicating and recording the departures of the shape of the surface of a workpiece under inspection from a reference shape, such as a circle or an ellipse.

According to one aspect of the present invention there is provided apparatus for indicating and recording the departures of the shape of the surface of a workpiece under inspection from a reference shape, such as a circle or an ellipse, comprising sensing means engaging the surface under inspection, rotating means for relatively rotating the sensing means with respect to the surface under test, signal generating means controlled by the sensing means for generating an electrical signal output, electrically responsive indicating means for converting said signal output into a profile curve upon a chart in spaced relation to a chart reference datum, such as a point or line, and signal derivation means for deriving from said signal output a signal representing said reference shape, wherein said signal derivation means comprise reference signal generating means for generating by integration a plurality of signals, the sum total of which represents said reference shape, whereby a reference curve representing said reference shape is formed on said indicating means in predetermined relationship with said profile curve and with said chart reference datum.

The signal generating means for generating signals the sum total of which represents said reference shape may comprise potentiometers and integrators controlled by said rotating means, and preferably comprise sine/cosine potentiometers arranged to rotate at whole multiples of the relative rotation of said workpiece and said sensing means, and integrators connected to said sine/cosine potentiometers, whereby a plurality of signals, the sum total of which represents the reference shape of the surface under inspection, are generated.

Conveniently said reference shape is an ellipse, and said reference signal generating means comprise a first sine/cosine potentiometer arranged to rotate in synchronism with said rotating means and connected to a first integrator, and a second sine/cosine potentiometer arranged to rotate at twice the speed of said rotating means and connected to a second integrator, while the apparatus may comprise in addition indicating means controlled by said signal generating means and said signal derivation means for indicating a quantity, such as the peak or average departures of the profile curve from the reference curve.

The apparatus is preferably provided with switch means with visual indication for selecting one of several different modes of operation of the apparatus and controlling the kind and number of signals included in any of said modes of operation, and the switch means are preferably arranged for a plurality of different sequences of operation comprising a first sequence for adjusting and setting the control elements of the apparatus, a second sequence for forming a profile curve and a circular reference curve, each during a separate complete relative revolution of said surface and said sensing means, both profile curve and said circular reference curve being in eccentric relationship to the centre of said chart, a third sequence for forming a profile curve and an elliptical reference curve, each during a separate complete relative revolution of said surface and said sensing means, both said profile curve and said elliptical reference curve being in eccentric relationship to the centre of said chart, and a fourth sequence for forming a profile curve and a reference curve sequentially and in concentric spatial relationship to the centre of said chart.

According to another aspect of the present invention, there is provided a method of indicating and recording the deviations of the shape of the surface of a workpiece under inspection from a reference shape, such as a circle or an ellipse, comprising the steps of disposing said workpiece approximately concentrically with sensing means associated with signal generating means controlled by said sensing means, generating an electrical signal output, amplifying said signal output, and deriving from said amplifying signal output a signal representing said reference shape by generating by integration a plurality of signals, the sum total of which represents said reference shape, whereby a reference curve representing said reference shape is formed on indicating means in predetermined relationship with a profile curve and with a chart reference datum.

An embodiment of apparatus according to the present invention will now be particularly described with reference to the accompanying drawings in which FIGURE 1 is a diagrammatic representation of the component parts of the apparatus;

FIGURES 2 and 3 show charts illustrating the operation of the apparatus, and

Figure 4:
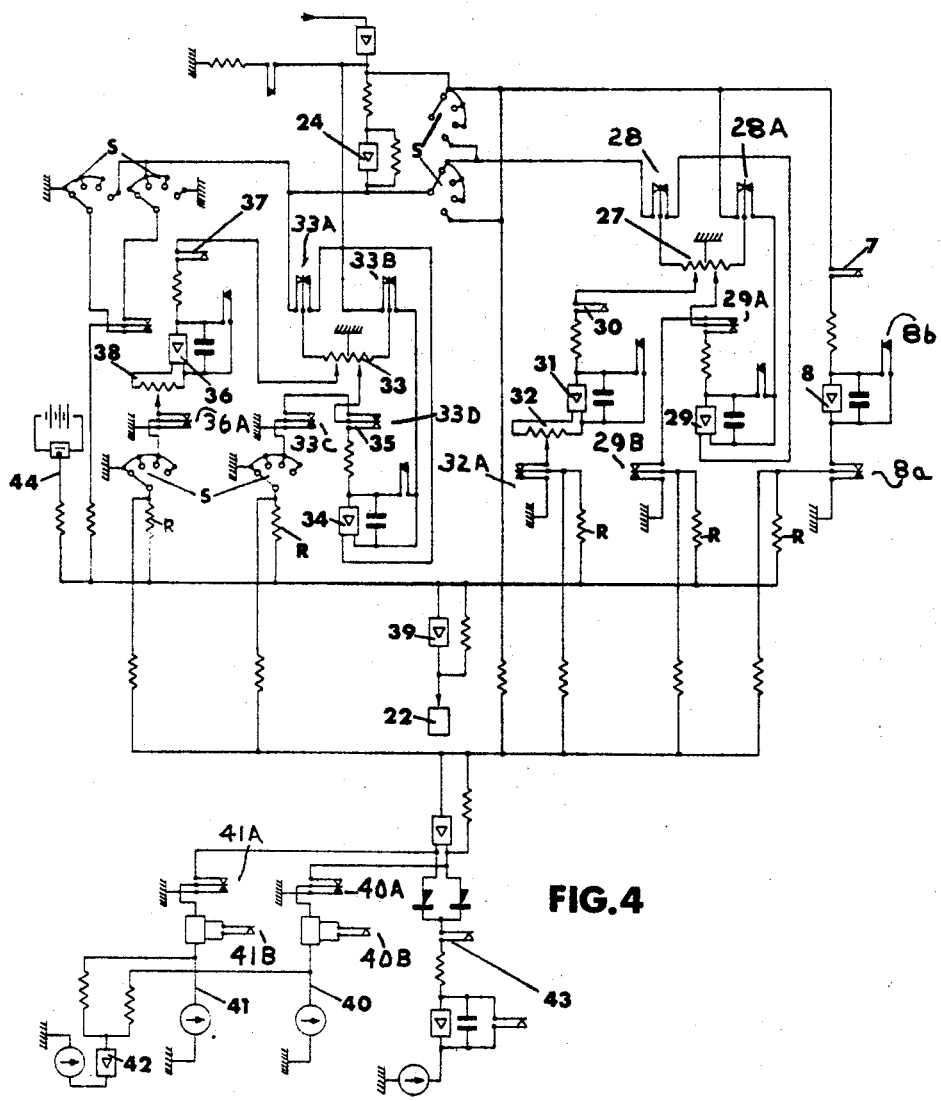
FIGURE 4 is a circuit diagram of the apparatus in diagrammatic form.

Referring to the drawings, an apparatus for indicating and recording the departures of the shape of the surface of a nominally elliptical workpiece 11 from an intended elliptical shape comprises two separate units, a measuring instrument 12 and a reference line generator 13 electrically connected to it. The measuring instrument 12 comprises a work table 14 for supporting the workpiece 11 in approximately concentric relationship under a spindle 15 supported in a quill 16.

Sensing means in the form of a gauge 17 having a stylus 18 mounted on a sensing arm 19 are mounted on the lower end of the spindle 15, so that during rotation of the spindle 15 about its own axis above the stationary workpiece 11 the stylus 18 is urged into contact with the surface of the workpiece 11, and an output signal representing variations in the shape of the workpiece 11 is generated in the usual way.

A rotatable chart table 20 arranged to rotate in synchronism with the spindle 15 carries a circular chart 21 having polar co-ordinates and consisting of electrically sensitive paper for inkless electrical marking. An electrically responsive indicating and recording instrument 22 is provided with a writing arm 23, the writing portion of which is arranged to move substantially radially with respect to the chart in the usual way, to draw a curve on the chart 21 in response to electric signals received by the indicating and recording instrument 22. As the stylus 18 slowly passes over the surface line the profile of which is to be inspected, an electrical output signal is generated proportional to the deflection of the stylus 18, and the output signal generated by the gauge 17 is amplified by an amplifier 24, see FIGURE 4.

The apparatus is capable of four different modes of operation, and any one of these may be selected by setting a switch S to the appropriate position.

For the production of a profile curve 25 upon the chart 21 representing the profile of the workpiece 11 along a particular line of its surface, for example at a predetermined level above the work table 14, the switch S is suitably set, and the workpiece 11 is fixed in position on the work table 14 by means of a self-centering device, not shown, so that it is approximately central, with perhaps a small amount of residual eccentricity with respect to the axis of the spindle 15. The stylus 18 is then placed in position against the surface of the workpiece 11 at a point on the line along which the profile is to be determined, and the spindle 15 is slowly rotated to carry the stylus 18 around the workpiece 11 for one complete revolution. During this relative revolution of the stylus 18 and the workpiece 11 the gauge 17 generates a gauge signal which is amplified by the amplifier 24, and the amplified signal is then supplied to the indicating and recording instrument 22, resulting in deflection of the writing arm 23, in accordance with variations in the input signal. While the spindle 15 rotates, the chart table 20 and chart 21 also rotate in synchronism, and the writing arm 23 draws a profile curve 25 upon the chart 21 in spaced relation to the centre of the chart which serves as a polar reference datum. The distance from the centre of the chart at which the profile curve 25 is drawn is controlled by adjustment of the gain of the amplifier 24 by the operator of the apparatus to obtain a chart 21 bearing a profile curve having a predetermined relation to the radial reference lines of the chart 21.

If the workpiece 11 is mounted concentrically with the axis of the spindle 15, the profile curve 25 will be drawn concentrically with the centre of the chart 21, while on the other hand if the workpiece 11 is not concentrically mounted, but has some residual eccentricity of the order of a few microns, then the profile curve on the chart will also be eccentric with respect to the centre of the chart 21, but on a greatly magnified scale, as shown in FIGURE 2.

When the profile curve 25 has been obtained it is desirable to use it for the purpose of seeing whether the workpiece 11 in question conforms to a reference shape, and, if not, what the departures from a reference shape are. Evaluation of the profile curve 25, once drawn, can proceed in several ways, but one method of evaluating the profile curve 25 is to ascertain its deviations from a reference curve bearing a known relationship to the intended shape of the workpiece 11. Thus, one reference curve which has found favour in the art is a closed curve 26, such as a circle, or an ellipse, corresponding to the intended shape of the workpiece 11, and superimposed upon the profile curve in such a way that the sum of the areas included between the reference curve 26 and the profile curve 25 inside the reference curve 26 is equal to the sum of the areas between the reference curve 26 and the profile curve 25 outside the reference curve 26. Such a reference curve 26 is also referred to as a "mean" curve because it represents the arithmetic mean of the profile curve 25. It can further be shown that such a reference curve 26 having the stated relationship to the profile curve 25 may be represented by a mathematical formula, which in this case is the mathematical equation of an ellipse. If the profile curve is denoted by $F(\theta)$, then the ellipse may be represented by the well-known mathematical expression:

$$F(\theta) = a_0 + a_1 \sin \theta + b_1 \cos \theta + a_2 \sin 2\theta + b_2 \cos 2\theta$$

in which:

$a_0$ is the integral from 0 to $2\pi$ of $f(\theta) d\theta$
$a_1$ is the integral from 0 to $2\pi$ of $f(\theta) \sin \theta d\theta$
$b_1$ is the integral from 0 to $2\pi$ of $f(\theta) \cos \theta d\theta$
$a_2$ is the integral from 0 to $2\pi$ of $f(\theta) \sin 2\theta d\theta$
$b_2$ is the integral from 0 to $2\pi$ of $f(\theta) \cos 2\theta d\theta$
$f(\theta)$ is the gauge signal.

In order to draw an ellipse fulfilling this mathematical condition on the chart 21 already bearing the profile curve 25, an appropriate signal is supplied to the indicating and recording instrument 22 during a further complete relative revolution of the spindle 15, and is made up of signals representing each of the terms of the mathematical equation hereinabove defined.

This process of generation and storage (during the first revolution) of the required terms, with the function switches in the position in the drawing, takes place as follows:

The first term of the equation, $a_0$, is generated and stored by supplying the output signal from the gauge 17 by way of the amplifier 24 to integrator 8 by way of relay switches 28, 28A and 7 which are shown in the normal and first of two operating conditions. In the drawing all the switches are shown in their normal first operating conditions.

The nomenclature used in the drawing and adopted in the following description is that the switch electrode provided with a contact represented by a straight line is the movable electrode, and in this first condition makes electrical connection with the unshaded contact, while being electrically insulated from the shaded contact where appropriate. In the second condition, the movable electrode makes electrical connection with the shaded contact where appropriate and becomes electrically insulated from the unshaded contact. At the end of one revolution of the stylus 18, the integral of the gauge output signal is stored in the integrator 8 and is made available when required by way of relay switch 8a. Relay switch 8b can be closed to empty the integrator 8 when the stored quantity is no longer required. Such a switch is provided in each of the integrators shown in the drawing and also is effective to empty each of the integrators when the associated switch is moved into the second position.

At the same time the second term of the equation, $a_1 \sin \theta$, is produced and stored during the revolution by supplying the amplified gauge output signal to a sine/cosine potentiometer 27 through a switch 28 and to an integrator 29 by way of switch 29A, where the term $a_1$ is produced. This term $a_1$ is subsequently passed through the sine potentiometer 27 by way of switch 28 when in the second position, to give the term $a_1 \sin \theta$ which is made available when required by way of switch 29A when in the second position and switch 29B.

The next term $b_1 \cos \theta$ is similarly made available by passing the output signal from the gauge 17 through the amplifier 24, then through the sine/cosine potentiometer 27, and through switch 30 to an integrator 31, to give the term $b_1$, and subsequently through a potentiometer 32 so that the term $b_1 \cos \theta$ is generated, and is available for subsequent operation as hereinafter described by way of switch 32A.

The term $a_2 \sin 2\theta$ is similarly made available by amplifying the output signal from the gauge 17 in amplifier 24 and passing the resultant signal through switch 33A and sine/cosine potentiometer 33, rotating at twice the speed of the spindle 15, and the output signal is supplied to an integrator 34 by way of a switch 35 to give the value $a_2$.

The sine/cosine potentiometer 33 is mounted on the head of the measuring instrument and geared to the spindle 15 to rotate at twice the speed of the spindle, thus giving the sine and cosine values of $2\theta$. When the signal proportional to $a_2$ is passed through the potentiometer 33, the term $a_2 \sin 2\theta$ is generated and is made available with switches 33C and 33D in the second position.

The remaining term $b_2 \cos \theta$ is similarly made available by producing the term $b_2$ in the integrator 36 by way of the potentiometer 33 and the switch 37, and the output from the integrator 36 is multiplied by $\cos 2\theta$ in a cosine potentiometer 38 to give a signal proportional to $b_2 \cos 2\theta$ by way of switch 36A.

When these five terms are added together the sum total amounts to the required value of $F(\theta)$ for every value of $\theta$, and when supplied to the indicating and recording instrument 22, through a summing amplifier 39, the indicating and recording instrument 22 will draw an ellipse on the chart 19 fulfilling the condition required of the reference curve as hereinabove defined.

At the end of one revolution of the stylus 18, therefore, signals proportional to the required terms are available, and in order to bring all the terms to the correct value in relation to one another, adding resistances R are provided to achieve this purpose.

It will be appreciated that the building up by integration of the signal required to produce the desired reference curve can also be applied to other curves, for example, analytically more involved curves having a larger number of terms in their mathematical representation, by adding to the number of integrators and associated circuit elements.

During one complete revolution of the stylus 18, therefore, the writing arm 23 can draw the profile curve 25 while simultaneously the signals of the terms of the reference curve 26 are being generated and stored, and during a further revolution of the apparatus the stored signals can be used to produce the actual reference curve 26.

Since it is often desired to have an indication of certain quantities such as the peak departure of the profile curve 25 from the reference curve 26, or an average departure of the profile curve 25 from the reference curve 26, a peak value registering circuit 40 for indicating the peak inward departure of the workpiece profile curve 25 from the reference curve 26 is provided when switches 40A and 40B are in the first position, while a corresponding peak value registering circuit 41 for peak outward departure is also provided when switches 41A and 41B are in the first position. A further adding circuit 42 for indicating the sum total of the peak inward and outward departures together with an indicating instrument 43 to show a further quantity, are also connected to the circuit.

These operations take place when the switch S is in its third position.

In the second position of the switch S, an alternative mode of operation is provided in that the reference curve 26, instead of being an ellipse, is a circle, not shown, having certain properties when compared with the profile curve 25. The profile curve 25 is in this case drawn in exactly the same way, but, subsequently, instead of the five terms of an ellipse being used as before, only the first three terms, representing a circle, are added together and supplied to the indicating and recording instrument 22.

The apparatus hereinabove described is also capable of compensating for any residual eccentricity between the workpiece 11 and the spindle 13. If in the foregoing operation of the apparatus there had been eccentricity between the workpiece 11 and the spindle 15 the profile curve 25 would have been drawn eccentric with respect to the centre of the chart 21, as shown in FIGURE 2. In many applications of the apparatus such an eccentrically drawn profile curve is not desirable, so that in a further mode of operation of the apparatus any residual eccentricity is compensated for by electrical means.

By setting the switch S to the fourth position it is possible to modify the output signal from the gauge 17, so that the writing arm 23 of the indicating and recording instrument 22 draws the profile curve 25 concentrically about the centre of the chart 19 in spite of eccentric mounting of the workpiece 11, as shown in FIGURE 3. The present apparatus is arranged for circular workpieces only in so far as compensation is concerned.

In order to understand this operation, it is useful first to consider what would happen if the eccentrically mounted workpiece 11 were perfectly round. If this were the case, then at the end of one revolution, the curve drawn by the writing arm 23 would be a perfect circle, but eccentric with respect to the centre of the chart by an amount proportional to the eccentricity between the axis of rotation of the sensing arm 19 and the centre of the workpiece 11. The circle thus drawn could be represented by the mathematical expression:

$$F(\theta) = a_0 + a_1 \sin \theta + b_1 \cos \theta$$

At the end of a first revolution the values $a_0$, $a_1$, and $b_1$ will have been generated and stored as before, and will be available in the relevant circuit elements hereinabove described. By using the stored values $a_0$, $a_1$, and $b_1$ it is possible to generate the terms of the above equation representing the circle. Thus the term $a_1 \sin \theta$ is generated by taking the stored value $a_1$ available in the integrator 29 and multiplying the value of it by $\sin \theta$ as generated in the potentiometer 27, while the term $b_1 \cos \theta$ is similarly generated by taking the stored value $b_1$ in the integrator 31 and multiplying it by the value of $\cos \theta$ obtained from the potentiometer 27. In order to subtract these two terms from the signal generated by the gauge, the two terms $a_1 \sin \theta$ and $b_1 \cos \theta$ are reversed in phase by means of the contacts of the switch S at the output of the input amplifier. Backing off of these terms against the gauge signal would result in the constant term $a_0$ alone being generated and supplied to the recording instrument, and the writing arm 23 would then maintain a steady corresponding deflection to draw a circle. The term $a_0$, however, is proportional to the deflection of the sensing arm 19, and is a constant term of the transducer output. It is important that the term $a_0$ is, of course, not proportional to the radius of the workpiece 11, but only to the deflection of the sensing arm 18 at any particular instant.

If the constant signal $a_0$ alone were supplied to the recording instrument 22, the recording arm 23 would describe a circle on the chart 21 at some arbitrary radius from the centre of the chart, depending on initial adjustment of the gauge means. It is, however, desirable to be able to draw the circle at will at a predetermined radius about the centre of the chart 21, and this is achieved by also subtracting the term $a_0$ from the gauge signal and substituting instead an arbitrary constant signal $a_r$, that is to say a D.C. signal so proportioned as to give the writing arm 23 a suitable deflection for drawing the circle in the desired predetermined position on the chart 21. This is done by using the value $a_0$ made available in the integrator 8 to back off against the gauge signal, and adding in its place an arbitrary value $a_r$ drawn from a supply source 44. A circle of a predetermined radius will, therefore, be drawn on the chart 21.

Taking the case now where the workpiece 11 is not a perfect circle, but a nominally circular workpiece, the surface profile of which is to be inspected, the gauge signal is a pure circle as before, but with higher harmonics added. These higher harmonics are not removed by the backing-off process just described which removes that portion of the gauge signal due to eccentric mounting of the workpiece, but they are still left, and are, therefore, drawn concentrically with respect to the centre of the chart 21.

The apparatus therefore enables the writing arm 23 to draw a reference circle 26 properly centred on the chart 21, as shown in FIGURE 3, during a first complete revolution of the spindle 15, and also a profile curve 26 during another revolution of the spindle 15, despite eccentricity between the workpiece 11 and the spindle 15, while the metering circuits 40, 41, 42 and 43 indicate the desired quantities as before.

It will be appreciated that although the apparatus according to the invention hereinabove described is concerned with an elliptical workpiece 11 and an elliptic profile curve 25 and reference curve 26, the apparatus can, of course, be used for other reference curves capable of being generated by integration. The reference curve does not have to be a closed curve, but the chart system used may for example use cartesion co-ordinates.

It will further be appreciated that other alternatives exist. The switches described may for example be electronic switches instead of mechanical ones, and instead of the variable gain amplifier 22, a fixed gain amplifier may be used in conjunction with an attenuator to give the same results. The moving parts of the apparatus, such as the potentiometers 27 and 33, may be mounted in any convenient place, and may be driven by suitable gearing from the spindle or by electric motors, while relative rotation may be achieved by rotating the workpiece and holding the sensing means steady. The metering circuit can also be used for determining other quantities, such as measuring the bearing area of the workpiece 11, or indicating the maximum peak to trough aberration of the surface of the workpiece 11, or to indicate the major and minor axes of the reference ellipse for the purpose of measuring the departure from it to determine acceptance or rejection of the workpiece being inspected.

I claim:

1. Apparatus for indicating and recording the departure of the surface profile of a non-circular workpiece from a reference profile corresponding to the shape of the workpiece comprising:
   (a) sensor means for engaging the surface of the workpiece and when moving over the surface for producing an electric output signal representative of the surface profile;
   (b) rotating means for producing relative rotation of the workpiece with respect to the sensor means;
   (c) a reference signal generator electrically connected to said sensor means, said generator including:
       (1) first signal derivation means producing from the sensor output signal a first component representative of the circular component of the nominal profile of the workpiece;
       (2) second signal derivation means producing from the sensor output signal a second component representative of the deviation of the nominal workpiece profile from the circular component, said first and second derivation means producing a plurality of signals the sum of which at any position of the sensor relative to a datum point on the workpiece surface represents the instantaneous value of the reference profile at that position, together with
       (3) a synthesizing circuit connected to receive the outputs from said first and second signal derivation means and to effect a continuous summation thereof, together with,
   (d) display means arranged to be selectively connectible to receive said sensor output signal to produce a first visible trace representative of the surface profile or to receive the summed quantities to produce a second visible trace representative of the reference profile.

2. Apparatus according to claim 1, wherein said first signal derivation means comprises a first integrator and store connected to said sensor to integrate and store the sensor output signal so as to produce for summation a quantity representative of the radius of said circular component, further integrators and stores, first signal modifying means responsive to the relative position between said workpiece datum point and the sensor and effective to modify a signal input in accordance with this position, said first signal modifying means being connected in a first revolution to apply the sensor output signal to said further integrators and stores to produce stored signals representative of the co-ordinates of any eccentricity between the center of the circle component of the workpiece and the axis of the rotating means and in a subsequent revolution to modify the stored signals according to this relative position for summation, said second signal derivation means comprising other integrators and stores together with second signal modifying means responsive to multiples of the relative position between said workpiece datum point and the sensor, said second signal modifying means being connected in a first revolution to pass the sensor output signals to said other integrators and stores, to produce stored quantities representative of the deviation of the nominal workpiece profile from said circular component, and in a subsequent revolution to modify the stored quantities for summation.

3. Apparatus according to claim 2 wherein said first signal modifying means comprise sine and cosine potentiometers arranged to rotate synchronously with said rotating means and one of said further integrators and stores connected with each potentiometer, and wherein said second signal modifying means comprise sine and cosine potentiometers arranged to rotate at multiples of the speed of said rotating means and connected with said other integrators and stores.

4. Apparatus according to claim 3 wherein the workpiece is nominally elliptical and wherein said second signal derivation means comprises a sine and cosine potentiometer each connected with one of said other integrators and stores and arranged to rotate at twice the speed of said rotating means.

5. Apparatus for indicating and recording the departure of the surface profile of a non-circular workpiece from a reference profile corresponding to the nominal shape of the workpiece comprising
   (a) sensor means for engaging the surface of the workpiece and when moving over the surface for producing an electric output signal representative of the surface profile,
   (b) rotating means for producing relative rotation of the workpiece with respect to said sensor means.
   (c) a first integrator and store connected to receive the profile signal from the sensor means,
   (d) second and third integrators and stores, sine and cosine potentiometers arranged to revolve synchronously with said rotating means, each of said potentiometers being selectively connected in a first revolution to apply the profile signal, modified according to the potentiometer setting, to a respective second or third integrator and store and in a subsequent revolution to modify the stored signal and deliver this modified signal for summation with the output of the first store,
   (e) fourth and fifth integrators and stores, sine and cosine potentiometers arranged to rotate at multiples of the relative rotation rate between the workpiece and said sensor means, each of said potentiometers being connected during a first revolution to apply the profile signal, modified according to the potentiometer setting, to a respective fourth or fifth integrator and store, and in a subsequent revolution to modify the stored signals and to deliver the modified signals for summation with the other stored signal and the modified signals,
   (f) summation means for effecting continuous summation of the modified and stored signals, together with (g) display means selectively connected to receive the sensor output signal to produce a first visible trace representative of the surface profile or to receive the summed signals to produce a second visible trace representative of the reference profile.

6. Apparatus according to claim 5 wherein the workpiece is of nominal elliptical profile and the sine and cosine potentiometers associated with said fourth and fifth integrators and stores are arranged to rotate at twice the speed of said rotating means.

7. Apparatus according to claim 5 wherein said display means comprise a chart arranged to rotate in synchronism with said rotating means together with an electrical responsive marker arranged to produce a visible trace upon the chart.

8. A method for indicating the departure of the surface profile of a non-circular workpiece from a reference profile such as a circular or an ellipse representative of the nominal profile of the workpiece, which comprises the steps of:
 (a) generating a profile signal representative of the workpiece profile by rotating the workpiece relative to a sensor responsive to the surface profile;
 (b) in a first complete revolution;
   (1) integrating and storing said profile signal to produce a first stored quantity;
   (2) modifying said profile signal in a first sine and cosine potentiometer rotating at the relative rotation rate between the workpiece and said sensor;
   (3) integrating and storing said modified profile signals to produce second and third stored quantities; and
   (4) modifying said profile signal in further sine and cosine potentiometers rotating at multiples of said relative rotation rate between the workpiece and said sensor to produce at least fourth and fifth stored quantities;
 (c) in a second revolution;
   (1) modifying said second and third stored quantities respectively in said first sine and cosine potentiometers;
   (2) modifying said fourth and fifth stored quantities respectively in said further sine and cosine potentiometers
 (d) and continuously summing said modified signals produced in said second revolution to produce a reference profile.

9. A method according to claim 8 wherein the workpiece has a nominal elliptical profile and said further sine and cosine potentiometers rotate at twice the relative rate between the workpiece and said sensor.

10. A method for indicating the departure of the surface profile of a non-circular workpiece from a reference profile representative of the nominal profile of the workpiece, which comprises the steps of:
 (a) generating a profile signal representative of the surface profile by rotating the workpiece relative to a sensor responsive to the surface profile;
 (b) in a first revolution, from said profile signal
   (1) producing a first quantity representative of the nominal radius of the circular component of the workpiece profile;
   (2) producing second and third quantities respectively representative of the coordinate values of any eccentricity between the center of said circular component and its axis of rotation relatively to said sensor; and
   (3) producing further quantities respectively representative of the co-ordinates of the deviation of the workpiece profile from said circular component;
 (c) in a second revolution;
   (1) continuously modifying said second and third quantities as a function of the relative position between a datum on the workpiece and said sensor;
   (2) continuously modifying said further quantities as a function of multiples of said relative position;
 (d) and continuously summing said modified quantities produced in said second revolution together with said first quantity to produce a summed signal the instantaneous value of which at any one of said relative positions corresponds to the instantaneous profile value at that position.

11. A method according to claim 10 wherein said further quantities are modified as functions of twice the relative position between the datum and said sensor.

References Cited

UNITED STATES PATENTS 3,222,791    2/1961    Huntley et al.

SAMUEL S. MATTHEWS. *Primary Examiner.*